United States Patent
Wang et al.

(10) Patent No.: US 12,333,343 B2
(45) Date of Patent: Jun. 17, 2025

(54) AVOIDANCE OF WORKLOAD DUPLICATION AMONG SPLIT-CLUSTERS

(71) Applicant: International Business Machines Corporation, Armonk, NY (US)

(72) Inventors: Hai Hui Wang, Xian (CN); Shan Gao, Beijing (CN); Yang Gao, Xian (CN)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 17/456,210

(22) Filed: Nov. 23, 2021

(65) Prior Publication Data

US 2023/0161633 A1  May 25, 2023

(51) Int. Cl.
*G06F 9/54* (2006.01)
*G06F 9/50* (2006.01)

(52) U.S. Cl.
CPC .............. *G06F 9/505* (2013.01); *G06F 9/542* (2013.01)

(58) Field of Classification Search
CPC ...... G06F 9/505; G06F 9/5083; G06F 9/5088; H04L 67/101; H04L 67/1012
See application file for complete search history.

(56) References Cited

U.S. PATENT DOCUMENTS

| | | | |
|---|---|---|---|
| 7,953,843 B2 * | 5/2011 | Cherkasova | H04L 65/613 709/224 |
| 8,108,715 B1 | 1/2012 | Agarwal et al. | |
| 9,460,183 B2 | 10/2016 | Dalton | |
| 10,320,703 B2 * | 6/2019 | Gahlot | H04L 47/746 |
| 10,560,315 B2 | 2/2020 | Yuan | |
| 10,956,230 B2 * | 3/2021 | Gopalan | G06F 9/5088 |
| 11,169,854 B2 * | 11/2021 | Gururaj | G06F 9/5055 |
| 11,593,583 B2 * | 2/2023 | Kallanagoudar | G06N 20/00 |
| 12,045,667 B2 | 7/2024 | Wang et al. | |
| 2013/0227359 A1 * | 8/2013 | Butterworth | G06F 11/2025 714/57 |
| 2014/0130057 A1 | 5/2014 | Fu et al. | |
| 2016/0283270 A1 | 9/2016 | Amaral et al. | |

(Continued)

FOREIGN PATENT DOCUMENTS

| | | |
|---|---|---|
| CN | 102308559 A | 1/2012 |
| CN | 102394914 A | 3/2012 |

(Continued)

OTHER PUBLICATIONS

Mell et al., "The NIST Definition of Cloud Computing," Computer Security Division, National Institute of Standards and Technology, Jan. 2011, 7 pages.

(Continued)

*Primary Examiner* — Andy Ho
(74) *Attorney, Agent, or Firm* — Yee & Associates, P.C.

(57) ABSTRACT

A computer implemented method avoids workload duplication in a cluster environment. The computer identifies a state change among a set of cluster resources in a cluster of nodes. Responsive to identifying the state change, the computer predicts resource requirements for a queued workload. The computer determines a pre-assignment of the queued workload to a sub-cluster according to the resource requirements that were predicted for the queued workload. The computer marks the queued workload to indicate the pre-assignment to the sub-cluster.

20 Claims, 8 Drawing Sheets

(56) References Cited

U.S. PATENT DOCUMENTS

2018/0300174 A1 10/2018 Karanasos et al.
2020/0250002 A1 8/2020 Gururaj et al.
2020/0410284 A1 12/2020 Kallanagoudar et al.

FOREIGN PATENT DOCUMENTS

| CN | 104158707 A | 11/2014 |
| CN | 112463390 A | 3/2021 |
| WO | 2017211042 A1 | 12/2017 |
| WO | 2023/093354 A1 | 6/2023 |

OTHER PUBLICATIONS

PCT International Search Report and Written Opinion, dated Nov. 28, 2022, regarding Application No. PCT/CN2022/125396, 9 pages.

* cited by examiner

AVOIDANCE OF WORKLOAD DUPLICATION AMONG SPLIT-CLUSTERS

BACKGROUND

1. Field

The disclosure relates generally to an improved computer system and more specifically to a method, apparatus, computer system, and computer program product for automatically avoiding workload duplication among split clusters.

2. Description of the Related Art

An orchestration platform, such as, for example, Kubernetes® (a registered trademark of the Linux Foundation of San Francisco, California), provides an architecture for automating deployment, scaling, and operations of application workloads across clusters of worker nodes. Many cloud services offer an orchestration platform as a service (e.g., Platform-as-a-Service, Infrastructure-as-a-Service, or the like).

An orchestration platform includes a controller node, which is a main controlling unit of a cluster of worker nodes (also known as host nodes, compute nodes, minions, and the like), managing the cluster's workload, and directing communication across the cluster. A worker node is a machine, either physical or virtual, where an application workload is deployed. The worker node hosts components of the application workload.

Although the cluster is connected to the wide area network, the cluster usually runs on its own separate local area network (LAN) with private connections between nodes. These private connections provide for inter-node communications to verify node status or to independently access cluster resources.

Nodes of a cluster require coordination to ensure tolerance to node failure. Synchronization failure between nodes may cause a "split-brain" state, where running cluster nodes incorrectly assume that the interrupted communication is a failure of the other nodes. Each cluster may then randomly serve data from their own idiosyncratic data set, without any coordination with the other data sets, causing data inconsistencies and corruption.

High-availability clusters usually use a heartbeat private network connection which is used to monitor the health and status of each node in the cluster. When the primary node fails, or when network connectivity between cluster nodes is lost, the cluster automatically switches over to a new primary in a failover process.

However, current failover processes only address switching of the primary node. When network connectivity fails between cluster nodes distributed across multiple physical sites, pending workloads are subject to duplicate deployments on multiple sub-clusters. Current failover processes do not consider cluster workloads.

SUMMARY

According to one illustrative embodiment, a computer implemented method for avoiding workload duplication in a cluster environment. The computer identifies a state change among a set of cluster resources in a cluster of nodes. Responsive to identifying the state change, the computer predicts resource requirements for a queued workload. The computer determines a pre-assignment of the queued workload to a sub-cluster according to the resource requirements that were predicted for the queued workload. The computer marks the queued workload to indicate the pre-assignment to the sub-cluster. According to other illustrative embodiments, a computer system, and a computer program product for managing a cluster are provided. As a result, the illustrative embodiments can provide a technical effect that avoids workload duplication across a split cluster through the pre-assignment of pending workloads.

The illustrative embodiments also permissively provide the steps of predicting resource requirements, determining the pre-assignment, and marking the queued workload a set of dispatch policies that are automatically enabled when the state change is identified among the set of cluster resources. As a result, reduction in workload scheduling can occur through providing the steps as being automatically enabled when the state change is identified among the set of cluster resources.

The illustrative embodiments can also permissively schedule the queued workload according to the pre-assignment in response to a failure of a network connection between the cluster of nodes. In scheduling the queued workload, the illustrative embodiments can permissively identify the pre-assignment of the queued workload to the sub-cluster, and schedule the queued workload for execution on the sub-cluster in response to identifying the pre-assignment to the sub-cluster. The sub-cluster schedules queued workloads that are pre-assigned to the sub-cluster, but does not schedule queued workloads that are pre-assigned to other sub-clusters. In predicting the resource requirements, the illustrative embodiments can also permissively model the queued workload on a set of machine learning models trained on the resource requirements of a completed workload, and predict the resource requirements of the queued workload from the set of machine learning models. In modeling the queued, the illustrative embodiments can also permissively generate metadata about the resource requirements of the completed workload, collect the metadata into a training data set, and train the set of machine learning models from the training data set. As a result, the illustrative embodiments can provide a technical effect that avoids workload duplication across a split cluster by scheduling queued workloads according to identified pre-assignments.

DETAILED DESCRIPTION

Figure 1:
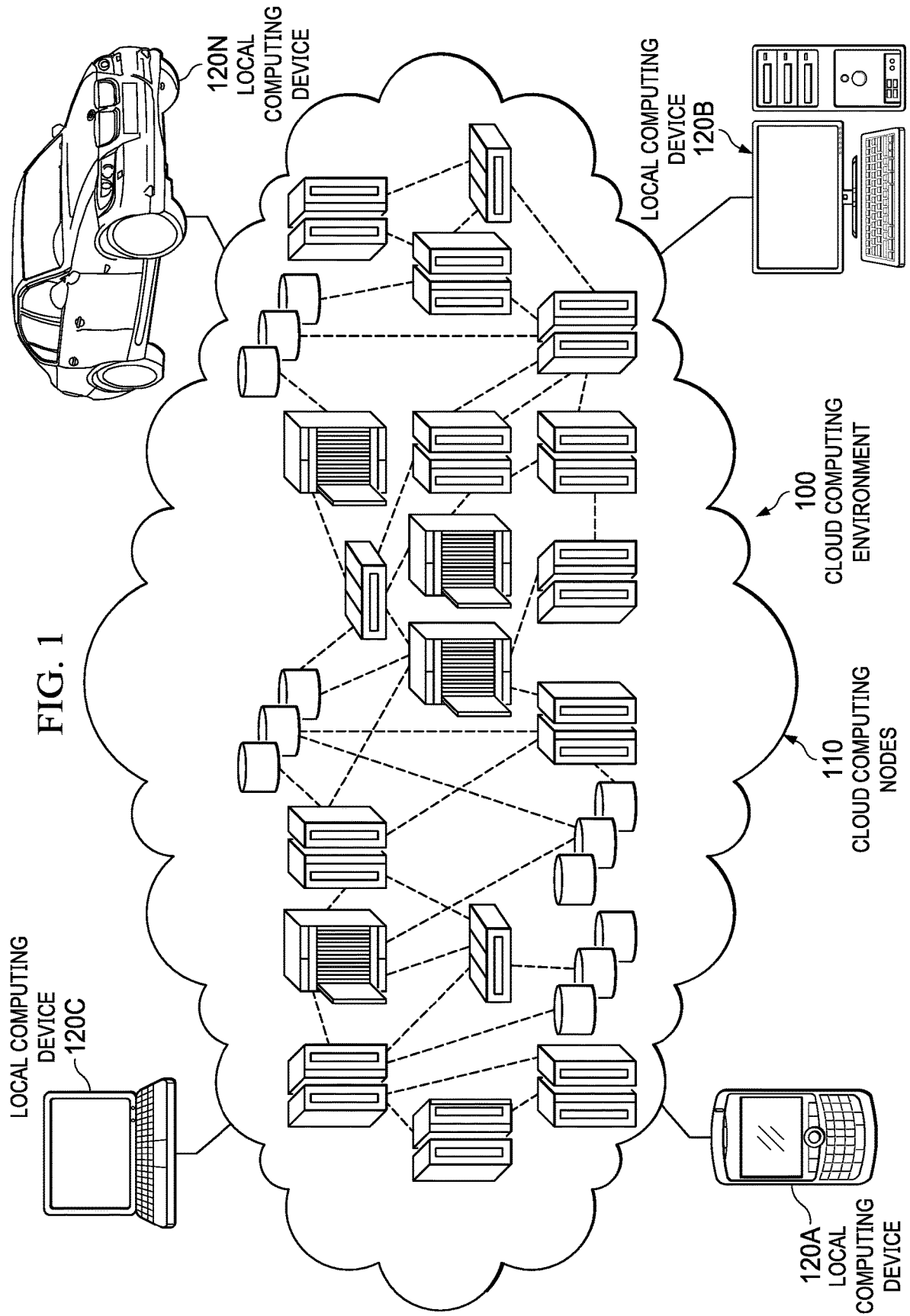
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The illustrative embodiments recognize and take into account various considerations. For example, the illustrative embodiments recognize and take into account that current failover processes only address switching of the primary node, and do not consider cluster workloads. There is a need to prevent duplicate deployments of pending workloads to multiple sub-clusters when network connectivity fails between cluster nodes.

In accordance with an illustrative embodiment, workload duplication can be avoided through dispatch policies that are automatically enabled when a state change is identified among cluster resources. The dispatch policies provide configurable rules for distinguishing the sub-cluster from other sub-clusters, including predicting resource requirements of a queued workload, determining a pre-assignment of the queued workload to a particular subcluster, and marking the queued workload in a workload queue according to the pre-assignment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
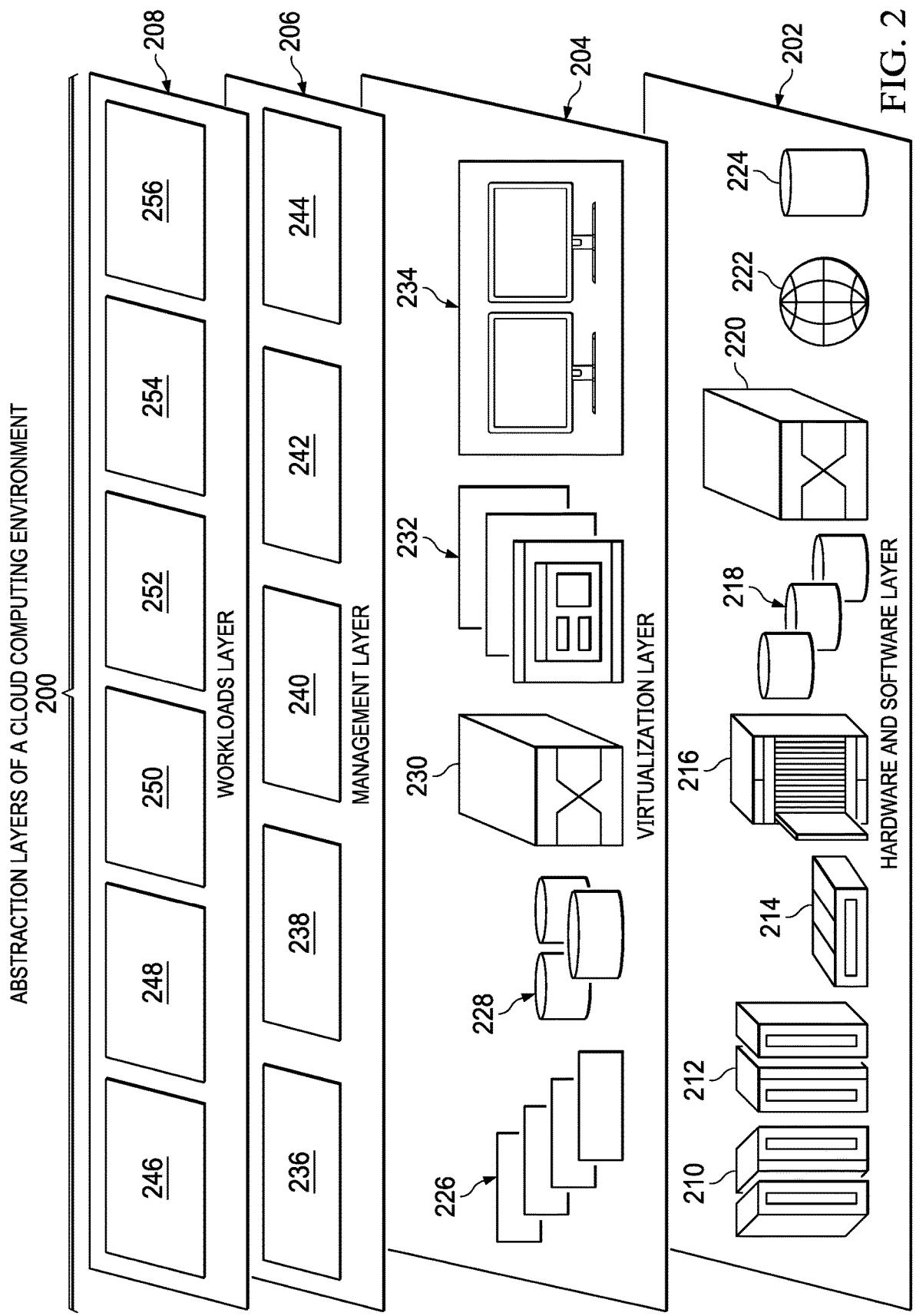
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and workload manager 256.

In this example, workload manager 256 can operate to schedule and mange workloads. In one or more illustrative examples, workload manager 256 schedule and mange workloads in a manner that avoids workload duplication across a split cluster.

Figure 3:
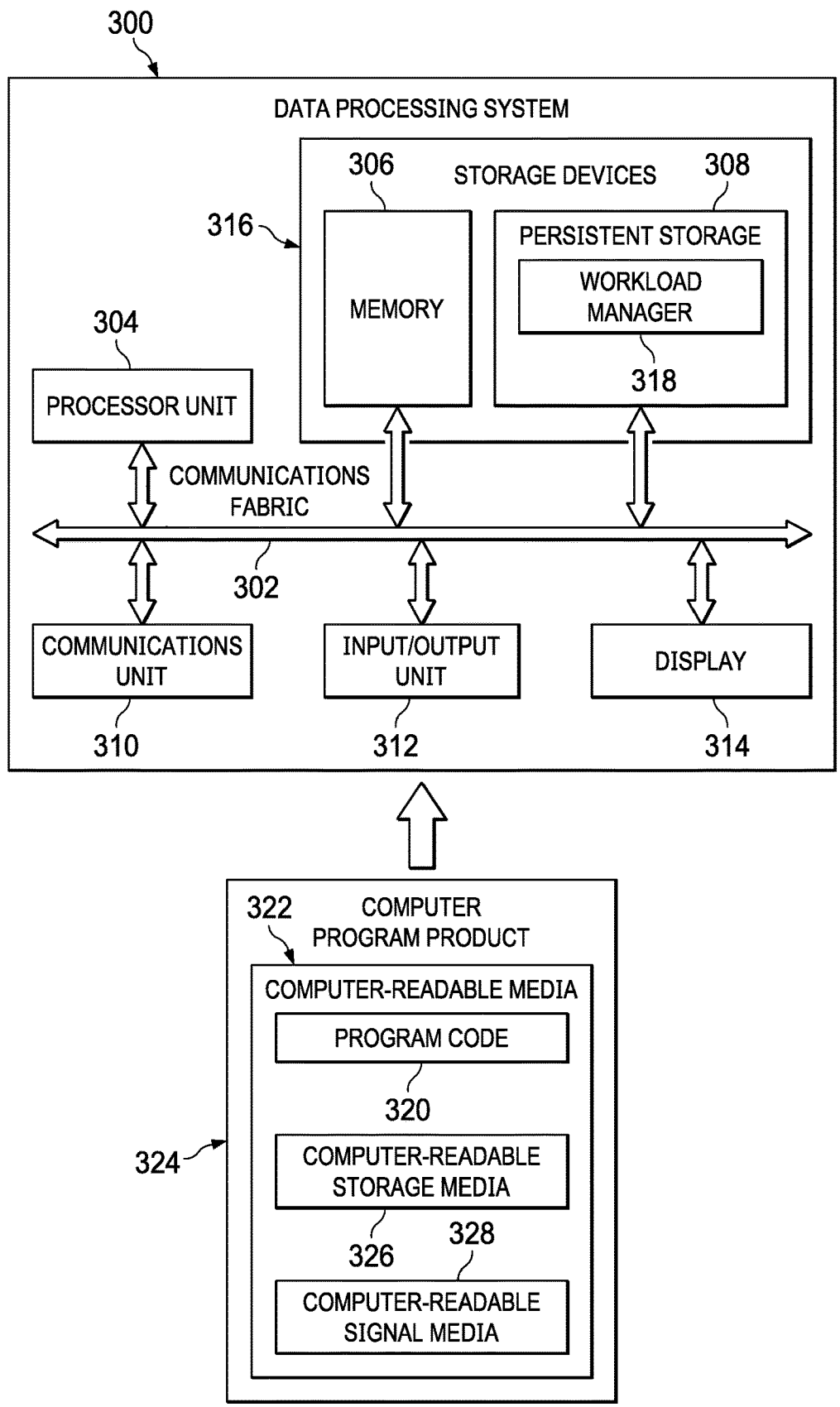
FIG. 3 is a diagram of a data processing system depicted in accordance with an illustrative embodiment.

With reference now to FIG. 3, a diagram of a data processing system is depicted in accordance with an illustrative embodiment. Data processing system 300 is an example of a computer, such as controller node 104 in FIG. 1, in which computer-readable program code or instructions implementing the workload manager processes of illustrative embodiments may be located. In this example, data processing system 300 includes communications fabric 302, which provides communications between processor unit 304, memory 306, persistent storage 308, communications unit 310, input/output (I/O) unit 312, and display 314.

Processor unit 304 serves to execute instructions for software applications and programs that may be loaded into memory 306. Processor unit 304 may be a set of one or more hardware processor devices or may be a multi-core processor, depending on the particular implementation.

Memory 306 and persistent storage 308 are examples of storage devices 316. As used herein, a computer-readable storage device or a computer-readable storage medium is any piece of hardware that is capable of storing information, such as, for example, without limitation, data, computer-readable program instructions in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 306, in these examples, may be, for example, a random-access memory (RAM), or any other suitable volatile or non-volatile storage device, such as a flash memory. Persistent storage 308 may take various forms, depending on the particular implementation. For example, persistent storage 308 may contain one or more devices. For example, persistent storage 308 may be a disk drive, a solid-state drive, a rewritable optical disk, a rewritable magnetic tape, or some combination of the above. The media used by persistent storage 308 may be removable. For example, a removable hard drive may be used for persistent storage 308.

In this example, persistent storage 308 stores workload manager 318. However, it should be noted that even though workload manager 318 is illustrated as residing in persistent storage 308, in an alternative illustrative embodiment, workload manager 318 may be a separate component of data processing system 300. For example, workload manager 318 may be a hardware component coupled to communication fabric 302 or a combination of hardware and software components.

Workload manager 318 can be implemented as part of an orchestration platform for automating deployment, scaling, and operations of applications running across a cluster of nodes. The orchestration platform can be, for example, a Kubernetes® architecture, environment, or the like. However, it should be understood that description of illustrative examples using Kubernetes is meant as an example architecture only and not as a limitation on illustrative embodiments.

Workload manager 318 provides methods for avoiding workload duplication in a cluster environment. In response to a state change among cluster resources, workload manager 318 predicts resource requirements for queued workloads, and pre-assigns the queued workloads according to their predicted resource requirements. Should a network connection fail between the cluster of nodes, the queued workloads are scheduled to sub-clusters according to the pre-assignment.

Communications unit 310, in this example, provides for communication with other computers, data processing systems, and devices via a network, such as network 102 in FIG. 1. Communications unit 310 may provide communications through the use of both physical and wireless communications links. The physical communications link may utilize, for example, a wire, cable, universal serial bus, or any other physical technology to establish a physical communications link for data processing system 300. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 300.

Input/output unit 312 allows for the input and output of data with other devices that may be connected to data processing system 300. For example, input/output unit 312 may provide a connection for user input through a keypad, a keyboard, a mouse, a microphone, and/or some other suitable input device. Display 314 provides a mechanism to display information to a user and may include touch screen capabilities to allow the user to make on-screen selections through user interfaces or input data, for example.

Instructions for the operating system, applications, and/or programs may be located in storage devices 316, which are in communication with processor unit 304 through communications fabric 302. In this illustrative example, the instructions are in a functional form on persistent storage 308. These instructions may be loaded into memory 306 for running by processor unit 304. The processes of the different embodiments may be performed by processor unit 304 using computer-implemented instructions, which may be located in a memory, such as memory 306. These program instructions are referred to as program code, computer usable program code, or computer-readable program code that may be read and run by a processor in processor unit 304. The program instructions, in the different embodiments, may be embodied on different physical computer-readable storage devices, such as memory 306 or persistent storage 308.

Program instructions 320 is located in a functional form on computer-readable media 322 that is selectively removable and may be loaded onto or transferred to data processing system 300 for running by processor unit 304. Program instructions 320 and computer-readable media 322 form computer program product 324. In one example, computer-readable media 322 may be computer-readable storage media 322 or computer-readable signal media 328.

In these illustrative examples, computer-readable storage media 322 is a physical or tangible storage device used to store program instructions 320 rather than a medium that propagates or transmits program instructions 320. Computer-readable storage media 322 may include, for example, an optical or magnetic disc that is inserted or placed into a drive or other device that is part of persistent storage 308 for transfer onto a storage device, such as a hard drive, that is part of persistent storage 308. Computer-readable storage media 322 also may take the form of a persistent storage, such as a hard drive, a thumb drive, or a flash memory that is connected to data processing system 300.

Alternatively, program instructions 320 may be transferred to data processing system 300 using computer-readable signal media 322. Computer-readable signal media 328 may be, for example, a propagated data signal containing program instructions 320. For example, computer-readable signal media 322 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media" can be singular or plural. For example, program instructions 320 can be located in computer-readable media 322 in the form of a single storage device or system. In another example, program instructions 320 can be located in computer-readable media 322 that is distributed in multiple data processing systems. In other words, some instructions in program instructions 320 can be located in one data processing system while other instructions in program instructions 320 can be located in one or more other data processing systems. For example, a portion of program instructions 320 can be located in computer-readable media 322 in a server computer while another portion of program instructions 320 can be located in computer-readable media 322 located in a set of client computers.

The different components illustrated for data processing system 300 are not meant to provide architectural limitations to the manner in which different embodiments can be implemented. In some illustrative examples, one or more of the components may be incorporated in or otherwise form a portion of, another component. For example, memory 306, or portions thereof, may be incorporated in processor unit 304 in some illustrative examples. The different illustrative embodiments can be implemented in a data processing system including components in addition to or in place of those illustrated for data processing system 300. Other components shown in FIG. 3 can be varied from the illustrative examples shown. The different embodiments can be implemented using any hardware device or system capable of running program instructions 320.

The different components illustrated for data processing system 300 are not meant to provide architectural limitations to the manner in which different embodiments may be implemented. The different illustrative embodiments may be implemented in a data processing system including components in addition to, or in place of, those illustrated for data processing system 300. Other components shown in FIG. 2 can be varied from the illustrative examples shown. The different embodiments may be implemented using any hardware device or system capable of executing program instructions. As one example, data processing system 300 may include organic components integrated with inorganic components and/or may be comprised entirely of organic components excluding a human being. For example, a storage device may be comprised of an organic semiconductor.

As another example, a computer readable storage device in data processing system 300 is any hardware apparatus that may store data. Memory 306, persistent storage 308, and computer readable storage media 326 are examples of physical storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
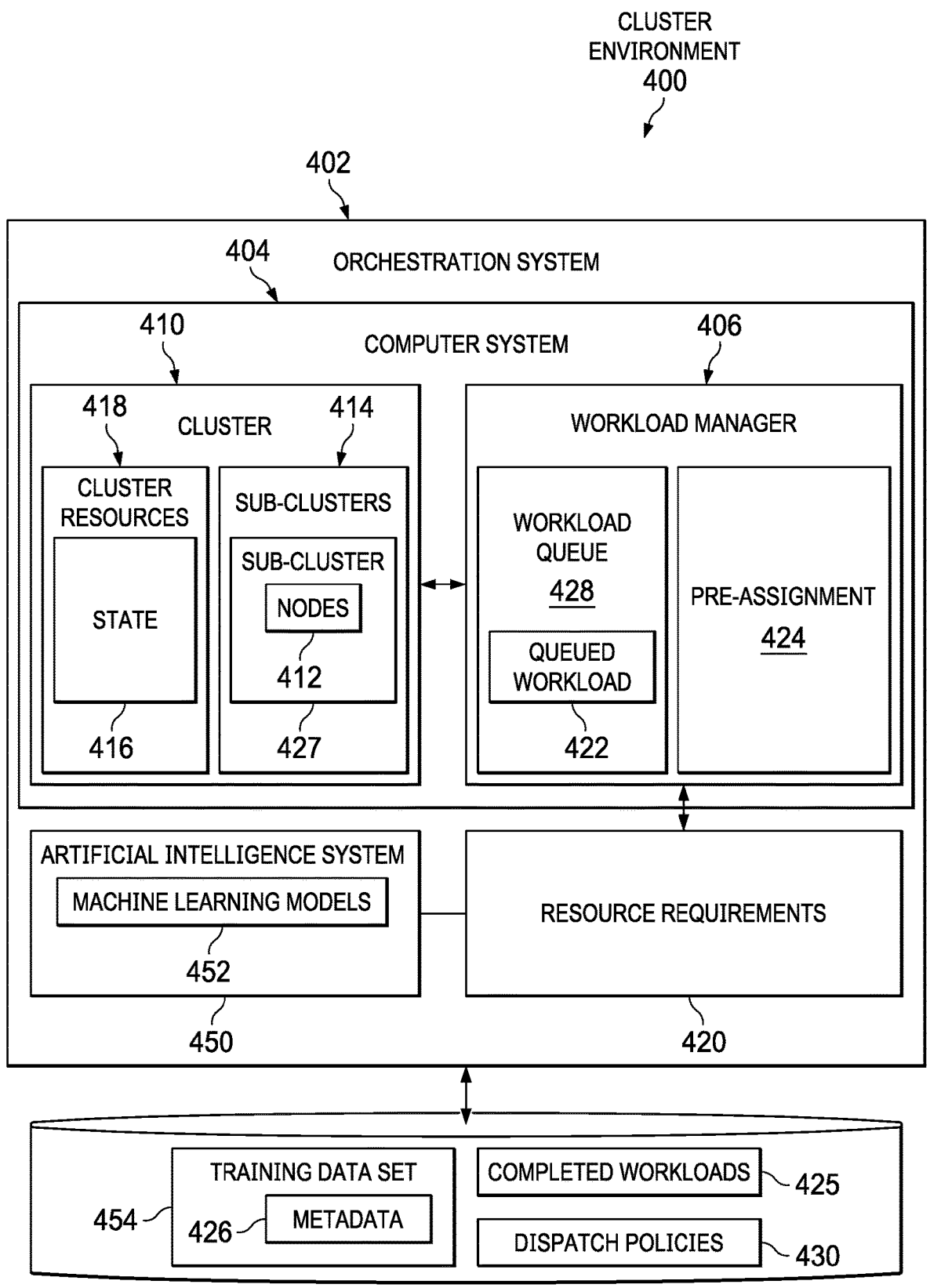
FIG. 4 is a block diagram of a cluster environment in accordance with an illustrative embodiment.

With reference now to FIG. 4, a block diagram of a cluster environment is depicted in accordance with an illustrative embodiment. In this illustrative example, cluster environment 400 includes components that can be implemented in hardware such as the hardware shown in cloud computing environment 100 in FIG. 1 and data processing system 300 in FIG. 3.

As depicted, orchestration system 402 comprises computer system 404 and workload manager 406. Workload manager 406 runs in computer system 404. Workload manager 406 can be implemented in software, hardware, firmware, or a combination thereof. When software is used, the operations performed by workload manager 406 can be implemented in program instructions configured to run on hardware, such as a processor unit. When firmware is used, the operations performed by workload manager 406 can be implemented in program instructions and data and stored in persistent memory to run on a processor unit. When hardware is employed, the hardware may include circuits that operate to perform the operations in workload manager 406.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 404 is a physical hardware system and includes one or more data processing systems. When more than one data processing system is present in computer system 404, those data processing systems are in communication with each other using a communications medium. The communications medium can be a network. The data processing systems can be selected from at least one of a computer, a server computer, a tablet computer, or some other suitable data processing system.

In this illustrative example, workload manager 406 in computer system 404 is configured to avoid duplication of queued workloads upon a split of cluster 410 due to the failure of one or more nodes 412. In a typical failure scenario, cluster 410 may be split into multiple sub-clusters 414 due to a faulty switching node or routing node.

Cluster 410 is a grouping of nodes 412, such as cloud computing nodes 110 of FIG. 1. Nodes 412 can be joined together through a public shared storage interconnect as well as a private internode network connection.

Workload manager 406 operates to identify a change in state 416 among a set of cluster resources 418. cluster resources 418 are the basic configurable unit managed by orchestration platform. For example, cluster resources may include physical hardware devices such as disk drives, or logical items such as IP addresses, network names, applications, and services.

State 416 is metadata representing the state of cluster 410, and can include information related to the status of key cluster components, including the cluster itself, the nodes in the cluster, the network interfaces connected to the nodes, and the resources available to each node.

In this illustrative example, workload manager 406 predicts resource requirements 420 for a queued workload 422. Queued workload 422 may be any type of workload, that is scheduled for dispatch, such as, for example, data processing, image processing, transaction processing, sensor monitoring, scientific calculations, forecasts, predictions, or the like. Resource requirements 420 are a minimal amount of cluster resources 418 which can satisfy the service level agreement (SLA). Prediction is performed in response to a change of state 416.

In some illustrative examples, workload manager 406 can use artificial intelligence system 450. Artificial intelligence system 450 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 450 can include a set of machine learning models 452. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using training data set 454 and process additional data to provide a desired output.

In one illustrative example, workload manager 406 predicts the resource requirements 420 by modeling the queued workload 422 on a set of machine learning models 452. In this example, machine learning models 452 are trained using the resource requirements of completed workload 425. Using the set of machine learning models 452, workload manager 406 can then predicts the resource requirements 420 of the queued workload 422.

For example, when cluster resources are released upon workload completion, orchestration system 402 may generate metadata 426. Metadata 426 is information about the resource requirements of a completed workload 425. For example, metadata 426 information such as a pending time (i.e., time in workload queue 428) of the completed workload 425, a running time of the completed workload 425, and an actual resource usage of the completed workload 425. orchestration system 402 collects the metadata 426 into a training data set 454, which can be used to train the set of machine learning models 452.

In this illustrative example, workload manager 406 determines a pre-assignment 424 of the queued workload 422 to one of sub-clusters 414. Workload manager 406 determines a pre-assignment 424 using one or more dispatch policies 430.

In this illustrative example, workload manager 406 determines a pre-assignment 424 of the queued workload 422 to a sub-cluster 427, according to the resource requirements 420 that were predicted for the queued workload 422. That is to say, resource requirements 420 are used as input for policy conditions of dispatch policies 430.

Dispatch policies 430 are groups of rules used to determine the conditions for scheduling workloads. Dispatch policies 430 can include one or more custom and built-in policies that provide configurable rules for distinguishing among sub-clusters for scheduling workloads. Dispatch policies 430 can be automatically enabled when the change of state 416 is identified among the set of cluster resources 418, and can include a policy for predicting resource requirements 420 and determining the pre-assignment 424, including rules for a Check if resource demand for workload is only provided by one sub-partition, a Check if the one side can provide enough resources for pending workload, and a policy for marking the queued workload 422 including rules for an Executable script for marking workloads according to the pre-assignment 424.

In one illustrative example, the status and order of dispatch policies 430 configurable, thereby enabling cluster administrators to control where workloads will be scheduling in the event of a network failure.

Workload manager 406 marks the queued workload 422 to indicate the pre-assignment 424 to the sub-cluster 427. When a network connection between nodes fails, cluster 410 may be split into multiple sub-clusters 414, with each of sub-clusters 414 implementing a local copy of workload manager 406. In response to a failure of a network connection between the cluster of nodes, sub-cluster 427 schedules Queued workload the according to the pre-assignment that was marked in workload queue 428. That is, sub-cluster does not schedule workloads that are pre-assigned to other sub-clusters.

Thus, illustrative embodiments provide an orchestration platform that avoids workload duplication in a cluster environment. A computer identifies a state change among a set of cluster resources in a cluster of nodes. Responsive to identifying the state change, the computer predicts resource requirements for a queued workload. The computer determines a pre-assignment of the queued workload to a sub-cluster according to the resource requirements that were predicted for the queued workload. The computer marks the queued workload to indicate the pre-assignment to the sub-cluster.

Additionally, the illustrative embodiments permissively provide a set of dispatch policies that are automatically enabled when the state change is identified among the set of cluster resources. The dispatch policies provide configurable rules for distinguishing the sub-cluster from other sub-clusters, including predicting resource requirements of a queued workload, determining a pre-assignment of the queued workload to a particular subcluster, and marking the queued workload in a workload queue according to the pre-assignment.

Furthermore, the dispatch policies provided in one or more illustrative embodiments enable cluster administrators to enable and disable build-in and custom policy, 1 as change the order in which policies are applied. Therefore, cluster deployment and management become more flexible.

Remote network connection issues do not impact cluster availability, such that scheduled applications do not break because of network issues.

Consequently, illustrative embodiments provide one or more technical solutions that overcome a technical problem with scheduling and managing workloads in a manner that avoids workload duplication across a split cluster. As a result, these one or more technical solutions provide a technical effect and practical application in the field of orchestration platform management.

The illustration of cluster environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
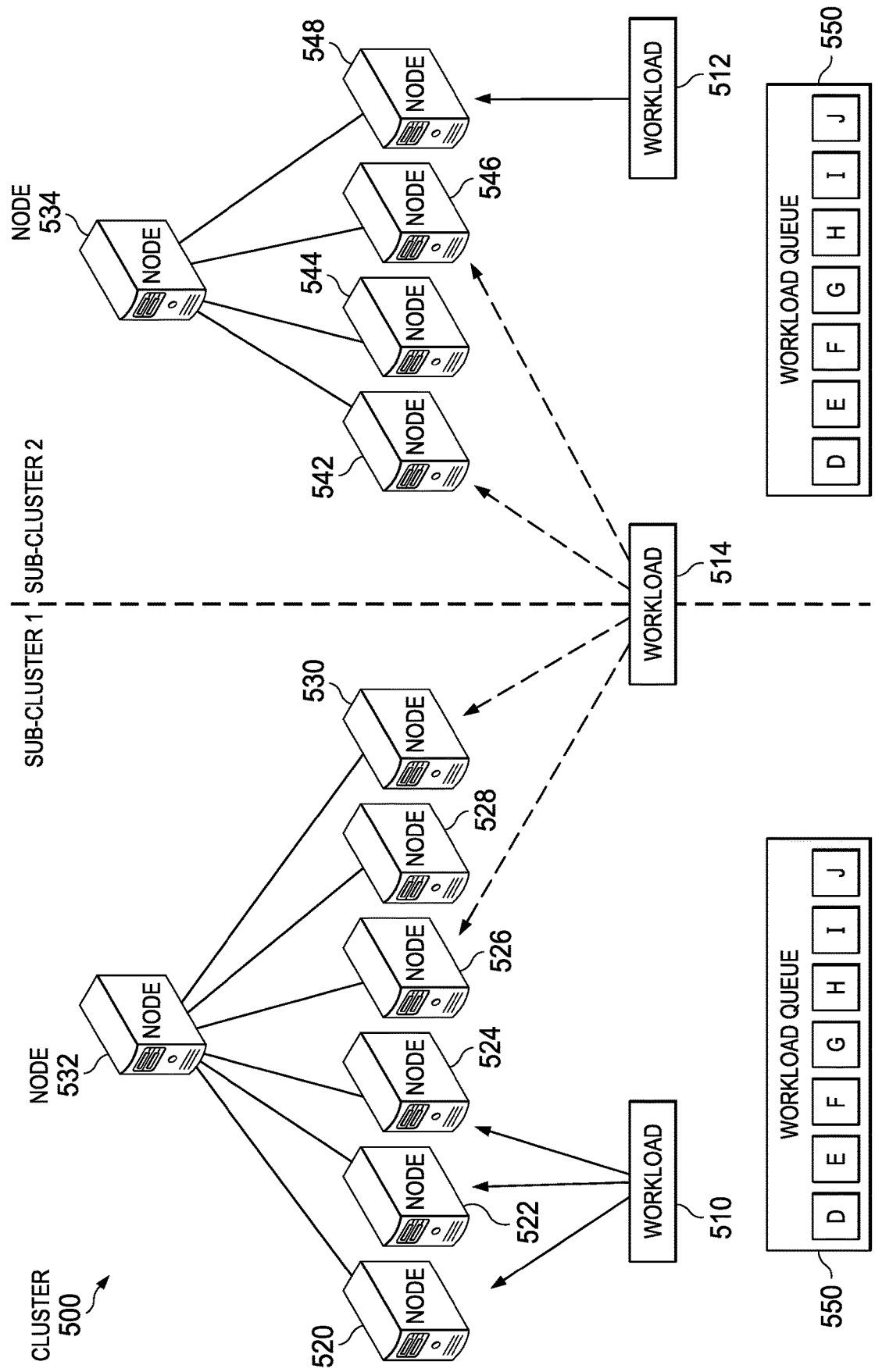
FIG. 5 is an illustration of a cluster depicted in accordance with an illustrative embodiment.

Turning now to FIG. 5, an illustration of a cluster is depicted in accordance with an illustrative embodiment. In this illustrative example, cluster 500 is an example of an implementation for cluster 410 in FIG. 4.

As shown in FIG. 5, cluster 500 includes workload 510, workload 512, and workload 514. Workload 514, which handles cross-site communication between cluster resources, has failed, splitting cluster 500 into sub-cluster 1 and sub-cluster 2. Sub-cluster 1 includes nodes 520-530, controlled by primary node 532. sub-cluster 2 includes nodes 542-548, controlled by primary node 534.

The splitting of cluster 500 causes the duplication of workload queue 550 across both sub-cluster 1 and sub-cluster 2. Without communication between the two sub-clusters, queued workloads D-J may be unintentionally deployed to both sub-cluster 1 and sub-cluster 2, yielding multiple running instances of the same workload.

Figure 6:
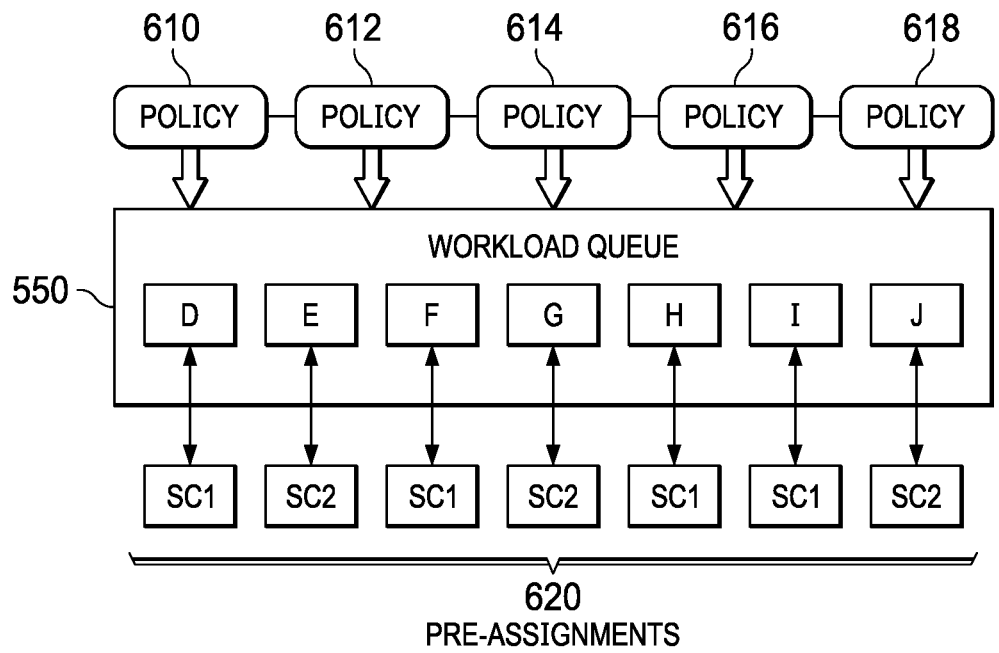
FIG. 6 is an illustration of workload pre-assignment depicted in accordance with an illustrative embodiment.

Turning now to FIG. 6, an illustration of workload pre-assignment is depicted in accordance with an illustrative embodiment. In this illustrative example, workload pre-assignment 600 is an example of an implementation for orchestration system 402 in FIG. 4.

As shown in FIG. 6, queued workloads D-J in workload queue 550 have been pre-assigned to either sub-cluster 1 or sub-cluster 2, exclusively. pre-assignments 620 are determined by applying one or more of policies 610-618. Policies 610-618 are examples of dispatch policies 430 of FIG. 4

Figure 7:
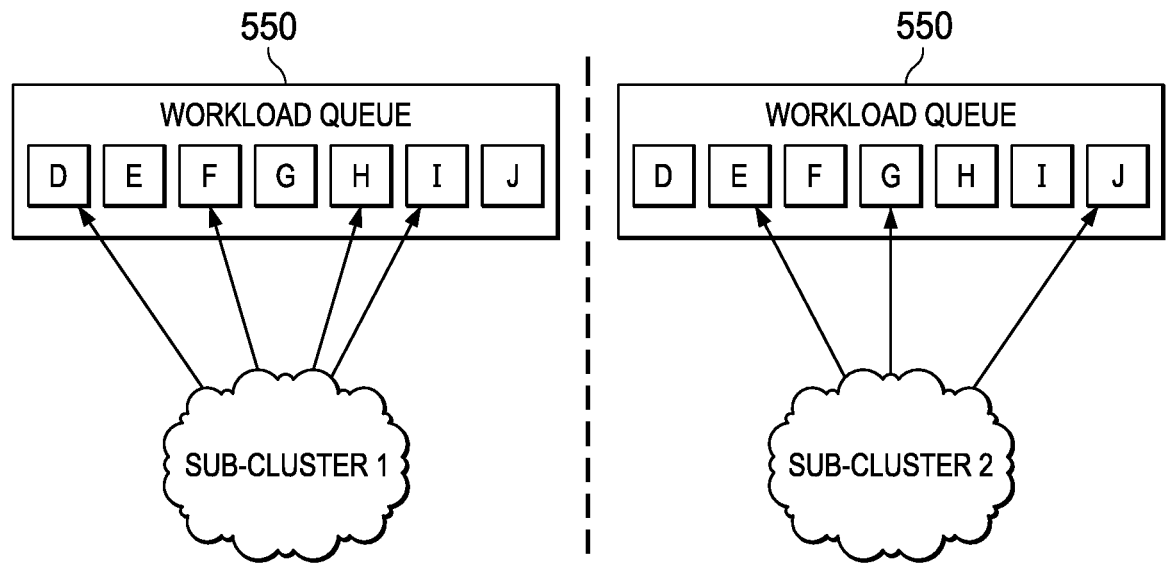
FIG. 7 is an illustration of workload management depicted in accordance with an illustrative embodiment.

Turning now to FIG. 7, an illustration of workload management is depicted in accordance with an illustrative embodiment. In this illustrative example, workload management 700 is an example of an implementation for orchestration system 402 in FIG. 4.

As shown in FIG. 7, subclusters schedules only workloads that have been marked with a corresponding pre-assignment, such as pre-assignments 620 of FIG. 6. As depicted, sub-cluster 1 schedules only workloads D, F, H, and I, as pre-assignments 620 of FIG. 6. sub-cluster 2 schedules only workloads E, G, and J, as pre-assignments 620 of FIG. 6. In this manner, duplicate deployment of can be avoided.

Figure 8:
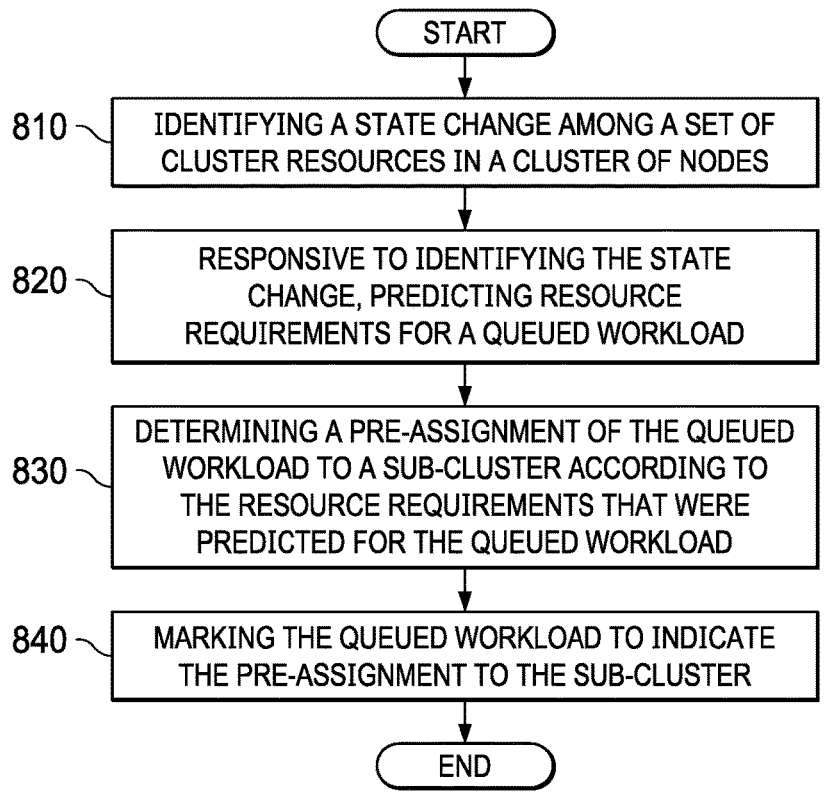
FIG. 8 is a flowchart of a process for avoiding workload duplication depicted in accordance with an illustrative embodiment.

Turning next to FIG. 8, a flowchart of a process for avoiding workload duplication is depicted in accordance with an illustrative embodiment. The process in FIG. 8 can be implemented in hardware, software, or both. When implemented in software, the process can take the form of program instructions that is run by one of more processor units located in one or more hardware devices in one or more computer systems. For example, the process can be implemented in workload manager 406 in FIG. 4. The processes in FIG. 8 can be provided as one or more dispatch policies that are automatically enabled when a state change is identified among the set of cluster resources.

The process begins when a state change is identifying among a set of cluster resources in a cluster of nodes (step 810). In responsive to identifying the state change, the process predicts resource requirements for a queued workload (step 820). The process determines a pre-assignment of the queued workload to a sub-cluster according to the resource requirements that were predicted for the queued workload. The process marks the queued workload to indicate the pre-assignment to the sub-cluster (step 840). Thereafter, the process terminates.

Figure 9:
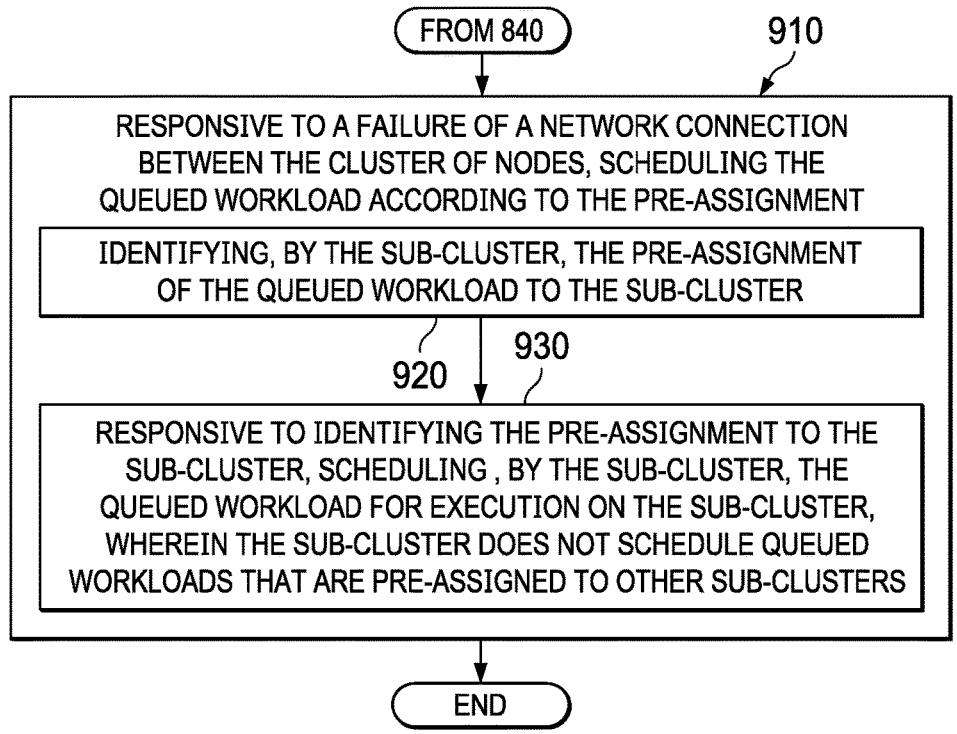
FIG. 9 is a flowchart of a process for scheduling a queued workload depicted in accordance with an illustrative embodiment.

With reference to FIG. 9, a flowchart of a process for scheduling the queued workload is depicted in accordance with an illustrative embodiment. The steps in the flowchart in FIG. 9 are examples of additional steps that can be performed with the steps in FIG. 8.

Continuing from step 840, responsive to a failure of a network connection between the cluster of nodes, scheduling the queued workload according to the pre-assignment (step 910). In one illustrative example, scheduling the queued workload includes identifying the pre-assignment of the queued workload to the sub-cluster (step 920). The pre assignment can be identified by the sub-cluster, based on a marking of the workload in a workload queue. Responsive to identifying the pre-assignment to the sub-cluster, scheduling, by the sub-cluster, the queued workload for execution on the sub-cluster (step 930). The sub-cluster does not schedule queued workloads that are pre-assigned to other sub-clusters. Thereafter, the process terminates.

Figure 10:
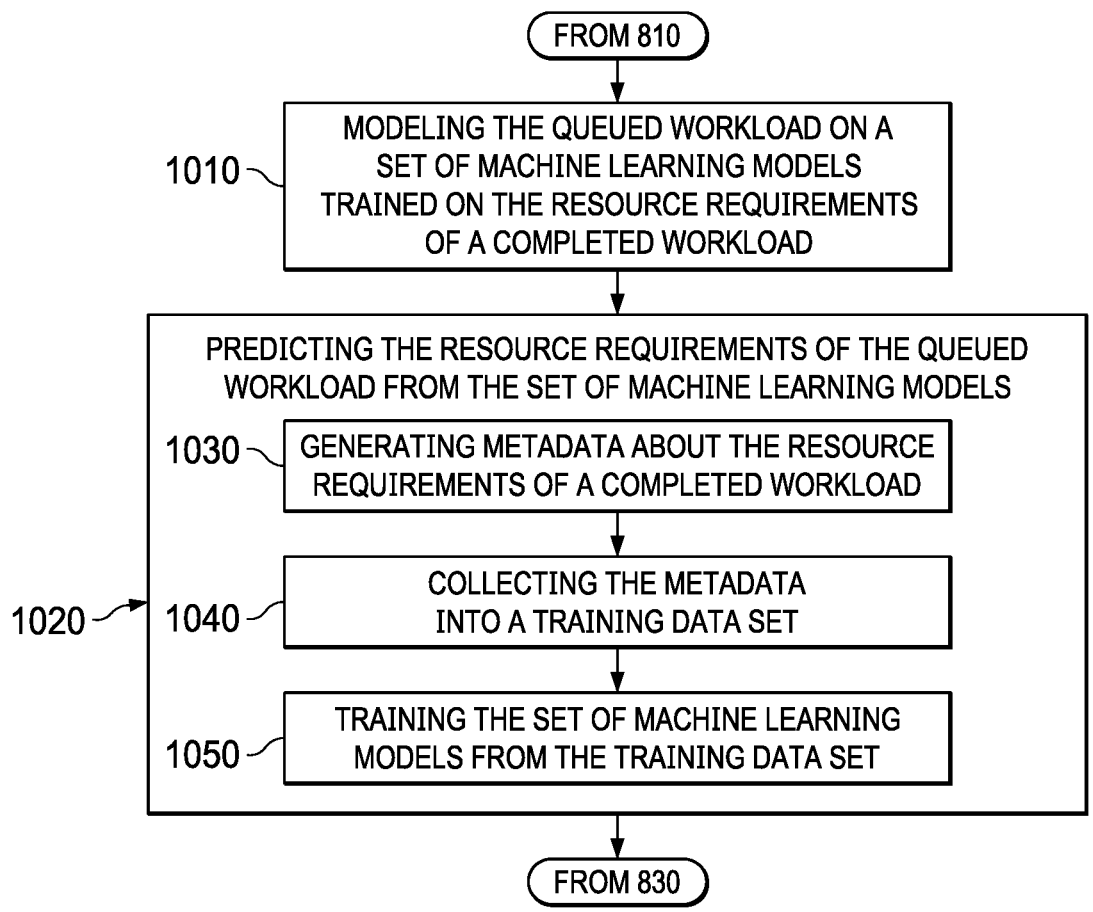
FIG. 10 is a flowchart of a process for predicting resource requirements of a queued workload depicted in accordance with an illustrative embodiment.

With reference next to FIG. 10, a flowchart of a process for predicting the resource requirements of the queued workload is depicted in accordance with an illustrative embodiment. The steps in the flowchart in FIG. 10 are examples of additional steps that can be performed with the steps in FIG. 8.

Continuing from step 810, the process models the queued workload on a set of machine learning models trained on the resource requirements of a completed workload (step 1010). The predicts the resource requirements of the queued workload from the set of machine learning models (step 1020). Thereafter, the process may continue to step 830 of FIG. 8.

In one illustrative example, the process uses information about completed workloads to train the machine learning models. The process generates metadata about the resource requirements of the completed workload (step 1030). The process collects the metadata into a training data set (step 1040). The process trains the set of machine learning models from the training data set (step 1050).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for avoiding workload duplication in a cluster environment, the method comprising:
   identifying, by a computer system, a state change among a set of cluster resources in a cluster of nodes;
   responsive to identifying the state change, predicting, by the computer system, resource requirements for a queued workload;
   determining, by the computer system, a pre-assignment of the queued workload to a sub-cluster according to the resource requirements that were predicted for the queued workload;
   marking, by the computer system, the queued workload to indicate the pre-assignment to the sub-cluster; and
   scheduling, by the sub-cluster of the computer system, the queued workload for execution on the sub-cluster, wherein the sub-cluster does not schedule queued workloads that are pre-assigned to other sub-clusters.

2. The method of claim 1, wherein the steps of predicting resource requirements, determining the pre-assignment, and marking the queued workload are provided as a set of dispatch policies that are automatically enabled when the state change is identified among the set of cluster resources.

3. The method of claim 2 wherein the set of dispatch policies comprises custom and built-in policies that provide configurable rules for distinguishing the sub-cluster from other sub-cluster s.

4. The method of claim 1, further comprising:
responsive to a failure of a network connection between the cluster of nodes, scheduling, by the computer system, the queued workload according to the pre-assignment.

5. The method of claim 4, wherein the step of scheduling the queued workload further comprises:
identifying, by the sub-cluster of the computer system, the pre-assignment of the queued workload to the sub-cluster.

6. The method of claim 1, wherein predicting the resource requirements further comprises:
modeling, by the computer system, the queued workload on a set of machine learning models trained on the resource requirements of a completed workload; and
predicting, by the computer system, the resource requirements of the queued workload from the set of machine learning models.

7. The method of claim 6, wherein modeling the queued workload further comprises:
generating, by the computer system, metadata about the resource requirements of the completed workload;
collecting, by the computer system, the metadata into a training data set; and
training, by the computer system, the set of machine learning models from the training data set.

8. The method of claim 7, wherein the metadata comprises:
a pending time of the completed workload;
a running time of the completed workload; and
a resource usage of the completed workload.

9. A computer system comprising:
a number of storage devices that store program instructions; and
a number of processor units in communication with the number of storage devices, wherein the number of processor units executes program instructions to:
identify a state change among a set of cluster resources in a cluster of nodes;
predict, in response to identifying the state change, resource requirements for a queued workload;
determine a pre-assignment of the queued workload to a sub-cluster according to the resource requirements that were predicted for the queued workload;
mark the queued workload to indicate the pre-assignment to the sub-cluster; and
scheduling, by the sub-cluster of the computer system, the queued workload for execution on the sub-cluster, wherein the sub-cluster does not schedule queued workloads that are pre-assigned to other sub-clusters.

10. The computer system of claim 9, wherein the steps of predicting resource requirements, determining the pre-assignment, and marking the queued workload are provided as a set of dispatch policies that are automatically enabled when the state change is identified among the set of cluster resources.

11. The computer system of claim 10, wherein the set of dispatch policies comprises custom and built-in policies that provide configurable rules for distinguishing the sub-cluster from other sub-clusters.

12. The computer system of claim 9, wherein the processor further executes the program instructions to:
schedule, responsive to a failure of a network connection between the cluster of nodes, the queued workload according to the pre-assignment.

13. The computer system of claim 12, wherein in scheduling the queued workload, the processor further executes the program instructions:
to identify the pre-assignment of the queued workload to the sub-cluster.

14. The computer system of claim 9, wherein in predicting the resource requirements, the processor further executes the program instructions to:
model the queued workload on a set of machine learning models trained on the resource requirements of a completed workload; and
predict the resource requirements of the queued workload from the set of machine learning models.

15. The computer system of claim 14, wherein in modeling the queued workload, the processor further executes the program instructions to:
generate metadata about the resource requirements of the completed workload;
collect the metadata into a training data set; and
train the set of machine learning models from the training data set.

16. The computer system of claim 15, wherein the metadata comprises:
a pending time of the completed workload;
a running time of the completed workload; and
a resource usage of the completed workload.

17. A computer program product for avoiding workload duplication in a cluster, the computer program product comprising a computer readable storage medium having program instructions embodied therewith, the program instructions executable by a computer system to cause the computer system to perform a method of:
identifying a state change among a set of cluster resources in a cluster of nodes;
responsive to identifying the state change, predicting resource requirements for a queued workload;
determining a pre-assignment of the queued workload to a sub-cluster according to the resource requirements that were predicted for the queued workload;
marking the queued workload to indicate the pre-assignment to the sub-cluster; and
scheduling, by the sub-cluster of the computer system, the queued workload for execution on the sub-cluster, wherein the sub-cluster does not schedule queued workloads that are pre-assigned to other sub-clusters.

18. The computer program product of claim 17, further comprising:
responsive to a failure of a network connection between the cluster of nodes, scheduling the queued workload according to the pre-assignment, wherein scheduling the queued workload further comprises:
identifying, by the sub-cluster, the pre-assignment of the queued workload to the sub-cluster.

19. The computer program product of claim 17, wherein predicting the resource requirements further comprises:
modeling the queued workload on a set of machine learning models trained on the resource requirements of a completed workload; and
predicting the resource requirements of the queued workload from the set of machine learning models.

20. The computer program product of claim 19, wherein modeling the queued workload further comprises:
   generating metadata about the resource requirements of the completed workload;
   collecting the metadata into a training data set; and
   training the set of machine learning models from the training data set.

\* \* \* \* \*